UNITED STATES PATENT OFFICE.

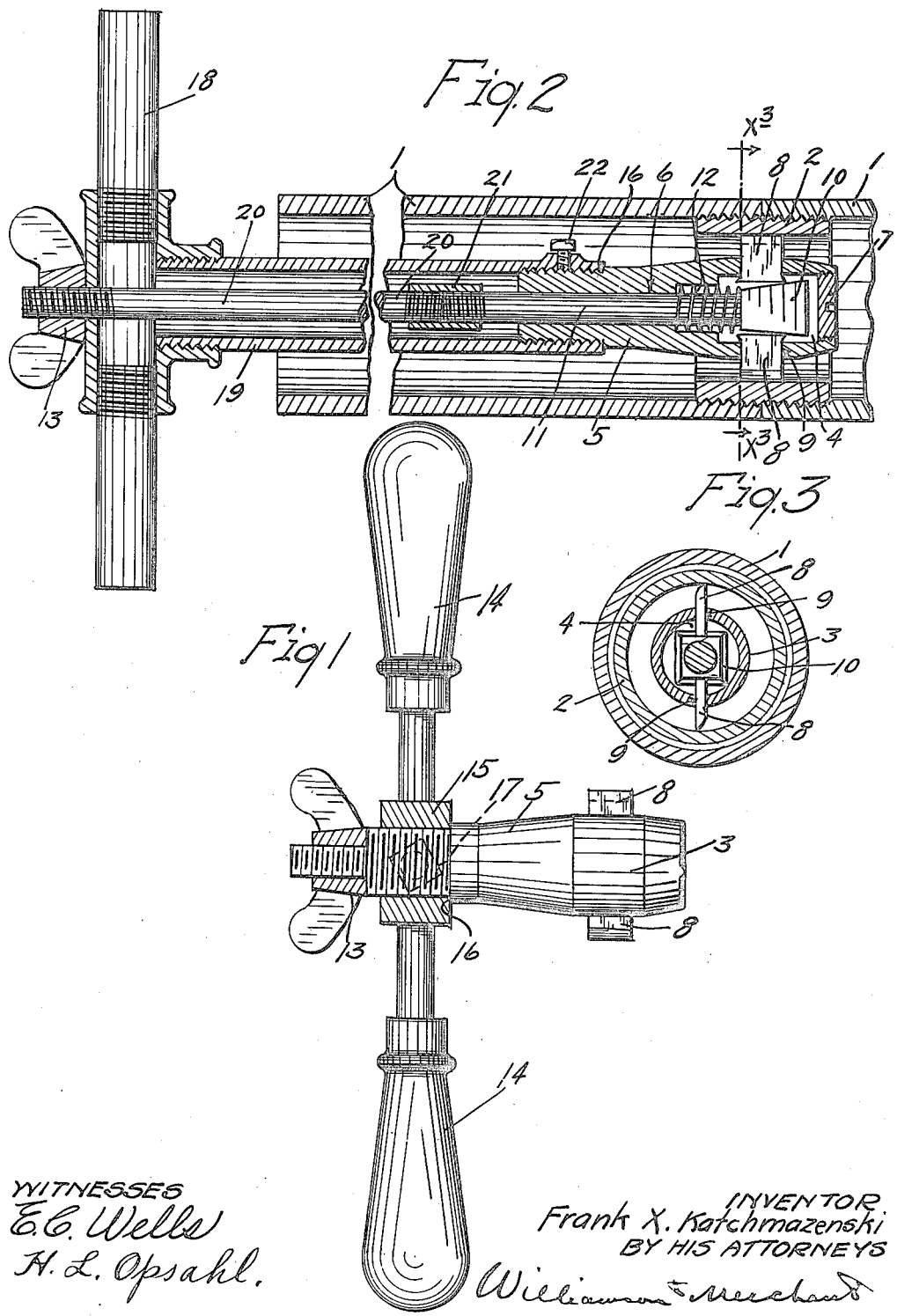

FRANK X. KATCHMAZENSKI, OF FOLEY, MINNESOTA, ASSIGNOR OF ONE-HALF TO HENRY JEDLICKI, OF FOLEY, MINNESOTA.

WRENCH.

1,231,262.  Specification of Letters Patent.  Patented June 26, 1917.

Application filed May 15, 1916. Serial No. 97,468.

*To all whom it may concern:*

Be it known that I, FRANK X. KATCHMAZENSKI, a citizen of the United States, residing at Foley, in the county of Benton and State of Minnesota, have invented certain new and useful Improvements in Wrenches; and I do hereby declare the following to be a full, clear, and exact description of the invention, such as will enable others skilled in the art to which it appertains to make and use the same.

My invention relates to improvements in expansible internal wrenches; and, to this end, it consists of the novel devices and combinations of devices hereinafter described and defined in the claim.

In the accompanying drawings, which illustrate the invention, like characters indicate like parts throughout the several views.

Referring to the drawings,

Figure 1 is a view of the improved wrench, principally in elevation, with some parts shown in longitudinal central section;

Fig. 2 is a view, principally in longitudinal central section, illustrating the wrench applied in working position and adjusted to turn an object that can not be reached by the wrench, as shown in Fig. 1; and Fig. 3 is a transverse section taken on the line $x^3$ $x^3$ of Fig. 2.

The numeral 1 indicates two pipe sections connected by an internal sleeve 2, having screw-threaded engagement therewith, and illustrated for the purpose of showing the invention applied in working position.

The numeral 3 indicates a rotatable body member, having in one end a recess 4 and having at its other end a shank 5 with an axial bore 6 extending into the recess 4. A screw plug 7 normally closes the recess 4. A pair of flat grip teeth 8 is mounted for radial sliding movement in diametrically opposite seats 9 formed in the body 3 and opening into the recess 4. The outer or biting ends of these teeth 8 have oppositely formed chisel-like edges, which extend axially with respect to the body 3. The inner ends of the grip teeth 8 extend into the recess 4 and are acted upon by a wedge block 10, having a stem 11 mounted in the bore 6 with its free end extending through the shank 5.

A coiled spring 12 surrounds the stem 6, is compressed between the bottom of the recess 4 and wedge block 10 and tends to move the said wedge block in a retracted position. The wedge block 10 is screw-controlled by a thumb nut 13, having screw-threaded engagement with the outer end of the stem 11 and re-acts against the shank 5 as a base of resistance. The body member 3 is rotated by a pair of radially projecting hand pieces 14 secured to a nut block 15, having screw-threaded engagement with the shank 5. A shoulder 16 is formed on the shank 5 against which the nut block 15 bears, and a set screw 17 holds the nut block 15 against rotation on the shank 5.

By turning the thumb nut 13 in the proper direction to draw the wedge block 10 between the grip teeth 8 against the tension of the spring 12, the grip teeth 8 may be moved radially outward into biting engagement with the object to be turned by the wrench, as shown, the sleeve 2. In the drawings, the grip teeth 8 are shown set to turn an object to the right. If it is desirable to turn the object to the left, the grip teeth 8 may be removed from the seats 9 and turned face for face, so as to operate in a reverse manner from that shown in the drawings. To reverse the grip teeth 8, it is, of course, necessary to remove the wedge block 10 through the opening in the recess 4 normally closed by the screw plug 7. The inner ends of the grip teeth 8 are upset to prevent their dropping out of the seats 9, when the wrench is not in use.

In case the object to be turned by the improved wrench can not be reached by the wrench, as shown in Fig. 1, the hand piece 14—15 may be removed and a hand piece 18, having a long tubular stem 19, may be attached to the shank 5 by screw-threaded engagement, as shown in Fig. 1. The thumb nut 13 is also removed and a stem extension 20 secured to the stem 11 by a sleeve 21. The outer end of the stem extension 20 projects through the hand piece 18 to receive the thumb nut 13, which has screw-threaded engagement therewith and re-acts against the hand piece 18, as a base of resistance in the operation of the wedge block 10. A set screw 22 is provided for locking the stem 19 to the shank 5. A solid object, such as a broken set screw, may be turned by the improved wrench by first drilling therein a hole to receive the wrench.

The above described invention, while extremely simple, has, in actual usage, proven highly efficient for the purpose had in view.

What I claim is:

A wrench of the kind described comprising a rotatable body member having at one end a recess and at its other end a shank with an axial bore extending into said recess, a screw plug normally closing said recess, a plurality of grip teeth mounted on the body member for radial movement, a wedge block mounted in said recess and having an operating stem projecting through the bore in said shank, a spring compressed between the bottom of said recess and the wedge block, a nut having screw-threaded engagement with the operating stem and reacting against the shank for drawing the wedge block into contact with the grip teeth to move the same outward, and a hand piece having screw-threaded engagement with the shank for rotating the body member.

In testimony whereof I affix my signature in presence of two witnesses.

FRANK X. KATCHMAZENSKI.

Witnesses:
L. WISMEWSKI,
A. C. KASNER.